United States Patent
Bates et al.

(10) Patent No.: US 7,702,164 B2
(45) Date of Patent: Apr. 20, 2010

(54) RUN LENGTH LIMITED ENCODING OF DATA INTO A 5×5 MATRIX FOR RECORDING INTO A HOLOGRAPHIC MEDIUM

(75) Inventors: Allen Keith Bates, Tucson, AZ (US); Nils Haustein, Soergenloch (DE); Craig Anthony Klein, Tucson, AZ (US); Henry Zheng Liu, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 11/534,588

(22) Filed: Sep. 22, 2006

(65) Prior Publication Data

US 2010/0027401 A1    Feb. 4, 2010

(51) Int. Cl.
*G06K 9/36* (2006.01)
*G03H 1/00* (2006.01)
(52) U.S. Cl. .......................... 382/232; 359/1
(58) Field of Classification Search ................. 382/232
See application file for complete search history.

(56) References Cited

U.S. PATENT DOCUMENTS

| | | | |
|---|---|---|---|
| 5,727,226 A | 3/1998 | Blaum et al. | 395/800 |
| 5,757,294 A * | 5/1998 | Fisher et al. | 341/59 |
| 5,808,998 A | 9/1998 | Curtis et al. | 369/103 |
| 5,887,090 A | 3/1999 | Rudolph et al. | 385/24 |
| 6,151,289 A | 11/2000 | Rope et al. | 369/112 |
| 6,285,302 B1 * | 9/2001 | McClellan | 341/59 |
| 2004/0123223 A1 * | 6/2004 | Halford | 714/781 |
| 2004/0252832 A1 | 12/2004 | Domjan et al. | 380/200 |

OTHER PUBLICATIONS

S. B. Odinokov, et al., The Optical System of the Device for Making a Hologram Matrix, SPIE, Jan. 1999, vol. 3633, pp. 279-284.

* cited by examiner

*Primary Examiner*—Charles Kim
*Assistant Examiner*—Nirav G Patel
(74) *Attorney, Agent, or Firm*—John H. Holcombe

(57) ABSTRACT

Holographic recording drives encode data for recording into a holographic medium. The steps comprise run length limited encoding three bytes of data into 5×5 matrix information, the data subject to a 4-byte error correction code; and providing the 5×5 matrix information to a spatial light modulator (SLM), as a portion of a two-dimensional pixel matrix of the spatial light modulator, for recording into a holographic image on the holographic medium.

6 Claims, 8 Drawing Sheets

FIG. 5

|         |         |         |         |         |
|---------|---------|---------|---------|---------|
| DET(0,4) | DET(1,4) | DET(2,4) | DET(3,4) | DET(4,4) |
| DET(0,3) | DET(1,3) | DET(2,3) | DET(3,3) | DET(4,3) |
| DET(0,2) | DET(1,2) | DET(2,2) | DET(3,2) | DET(4,2) |
| DET(0,1) | DET(1,1) | DET(2,1) | DET(3,1) | DET(4,1) |
| DET(0,0) | DET(1,0) | DET(2,0) | DET(3,0) | DET(4,0) |

FIG. 7

RUN LENGTH LIMITED ENCODING OF DATA INTO A 5×5 MATRIX FOR RECORDING INTO A HOLOGRAPHIC MEDIUM

Commonly assigned U.S. Pat. No. 6,275,965 is incorporated for its showing of error correction methods and systems that may be employed with the present invention.

FIELD OF THE INVENTION

This invention relates to holographic recording, and, more particularly, to encoding data for recording into a holographic medium.

BACKGROUND OF THE INVENTION

Data is typically recorded into a holographic medium by employing a spatial light modulator (SLM) which produces a data beam from a carrier beam. The data beam is two-dimensional in nature and comprises a rectangular image of a large number of bits arranged in a sequential raster pattern. The data beam and a reference beam (typically originally split from the carrier beam) are separately directed to the holographic medium and intersect and interfere to form an interference wave front that is recorded as a holographic image known as a hologram into the holographic medium. The data is read by providing a reference beam directed to the holographic medium at the location of the hologram and the output beam is directed to an optical sensor. The optical sensor is arranged to detect an image resulting from the interaction of the hologram and the reference beam.

The arrangement of the sequential raster pattern comprises strings of serial data and may be subject to errors that exceed the capabilities of an error correction code applied to the data.

SUMMARY OF THE INVENTION

Methods, encoding systems, recording systems and holographic recording drives encode data for recording into a holographic medium. In one embodiment, the steps comprise run length limited encoding three bytes of data into 5×5 matrix information, the data subject to a 4-byte error correction code; and providing the 5×5 matrix information to a spatial light modulator (SLM), as a portion of a two-dimensional pixel matrix of the spatial light modulator, for recording into a holographic image on the holographic medium.

In a further embodiment, the data to be run length limited encoded is encoded with an error correction code having 4-bit burst, 4-byte string length capability.

In another embodiment, the run length limited encoding step comprises a (0, 14/13) run length limited code.

In a further embodiment, the run length limited encoding step comprises the formula:

First Row of Spatial Light Modulator
SLM(0,0)=(U4 <OR> U5 <OR> U6 <OR> U7) <AND> [U2 <AND> ¬(U0 <AND> U3) <OR> U0 <AND> (¬U1 <OR> U2)]
SLM(0,1)=(U4 <OR> U5 <OR> U6 <OR> U7) <AND> (U0 <OR> ¬U2)
SLM(0,2)=¬[(U0 <OR> U1 <OR> U2 <OR> U3) <AND> (U4 <OR> U5 <OR> U6 <OR> U7)] <OR> U1
SLM(0,3)=¬[(U0 <OR> U1 <OR> U2 <OR> U3) <AND> (U4 <OR> U5 <OR> U6 <OR> U7)] <OR> U2
SLM(0,4)=[(U0 <OR> U1 <OR> U2 <OR> U3) <AND> ¬(U4 <OR> U5 <OR> U6 <OR> U7)] <OR> U3

Second Row of Spatial Light Modulator
SLM(1,0)=V0, SLM(1,1)=V1, SLM(1,2)=V2, SLM(1,3)=V3, SLM(1,4)=V4

Third Row of Spatial Light Modulator
SLM(2,0)=V5, SLM(2,1)=V6, SLM(2,2)=V7
SLM(2,3)={[(U0<OR> U1<OR> U2 <OR> U3) <AND> ¬(U4 <OR> U5 <OR> U6 <OR> U7)] <OR> U4} <AND> (U0 <OR> U4)
SLM(2,4)={[(U0 <OR> U1 <OR> U2 <OR> U3) <AND> ¬(U4 <OR> U5 <OR> U6 <OR> U7)] <OR> U5} <AND> (U1 <OR> U5)

Fourth row of Spatial Light Modulator
SLM(3,0)={[(U0 <OR> U1 <OR> U2 <OR> U3) <AND> ¬(U4 <OR> U5 <OR> U6 <OR> U7)] <OR> U6} <AND> (U2 <OR> U6)
SLM(3,1)={[(U0 <OR> U1 <OR> U2 <OR> U3) <AND> ¬(U4 <OR> U5 <OR> U6 <OR> U7)] <AND> U3} <OR> U7 <OR> ¬(U0 <OR> U1 <OR> U2 <OR> U3 <OR> U4 <OR> U5 <OR> U6 <OR> U7)
SLM(3,2)=W0, SLM(3,3)=W1, SLM(3,4)=W2

Fifth Row of Spatial Light Modulator
SLM(4,0)=W3, SLM(4,1)=W4, SLM(4,2)=W5, SLM(4,3)=W6, SLM(4,4)=W7.

In another embodiment, the spatial light modulator pixel matrix is recorded on the holographic medium.

For a fuller understanding of the present invention, reference should be made to the following detailed description taken in conjunction with the accompanying drawings.

BRIEF DESCRIPTION OF THE DRAWINGS

FIG. 5 is a depiction of a 5×5 matrix of the spatial light modulator (SLM) of FIG. 2 or of FIG. 3;

FIG. 7 is a depiction of a 5×5 matrix of the detection of FIG. 6; and

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
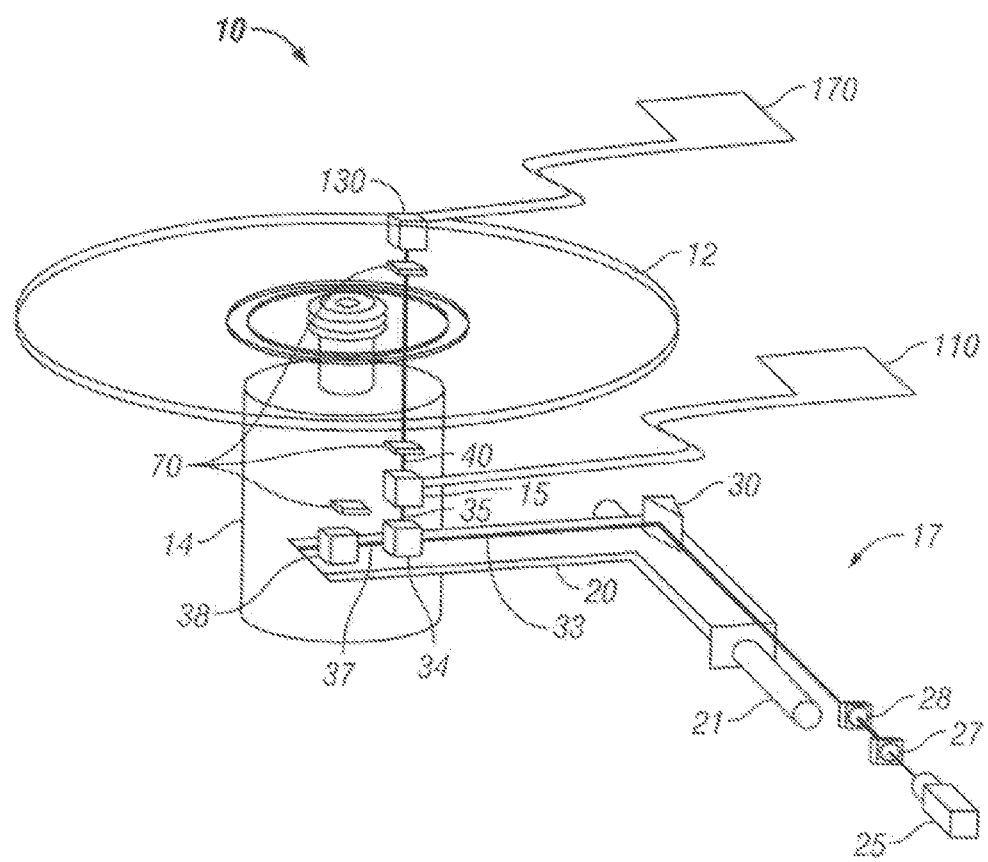
FIG. 1 is a diagrammatic illustration of a holographic recording drive which may implement the present invention.

Referring to FIG. 1, an embodiment of a holographic recording drive 10 is illustrated comprising a holographic medium 12 in the form of a disk, and a motor 14 to position the holographic medium 12 for recording by rotating the disk into a desired position. A spatial light modulator 15 is configured to provide a two-dimensional pixel matrix, and a holographic imaging system 17 is configured to provide beams to record an optical wavefront representing the spatial light modulator pixel matrix into the holographic medium 12.

In the example, a slider 20 rises on a rail 21 to position the holographic imaging system 17 at different radial positions of the holographic medium 12. As is known to those of skill in the art, various positioning systems may be employed to position the holographic medium 12 with respect to the holographic imaging system, and the holographic medium 12 may take various forms. The holographic imaging system may comprise a laser 25, configured to operate at a wavelength compatible with the holographic medium 12, a lens 27 and a waveplate 28 to generate a wavefront, as is known to those of skill in the art. A mirror 30 may be provided to reflect the wavefront beam 33 to a beam splitter 34. Examples of lasers 25 include those that operate at DVD-R (red 680 nm), those that operate at DVD-B (blue 405 nm), and those that operate at infrared (780 nm).

A beam splitter 34 splits the beam 33 into a carrier beam 35 and a reference beam 37. The reference beam 37 is reflected by mirror 38 and directed to the holographic medium 12. The carrier beam 35 is modulated by the spatial light modulator 15 and the image from the spatial light modulator comprises a signal beam 40 which is directed to the holographic medium 12, where it produces an interference pattern with the reference beam 37 to form a hologram in the holographic medium 12.

Figure 2:
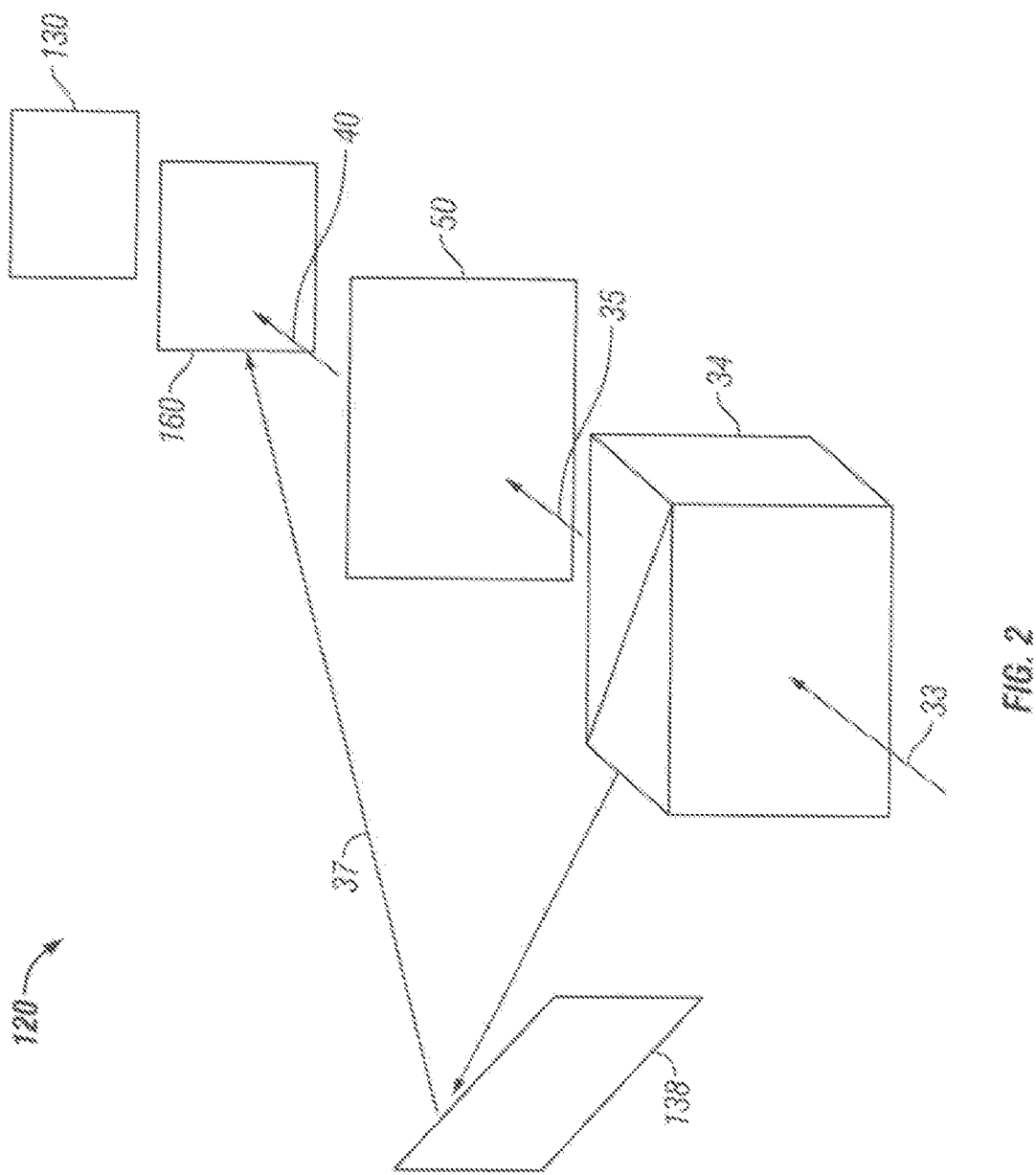
FIG. 2 is a diagrammatic illustration of the holographic recording imaging system and holographic medium of FIG. 1.

Various types of spatial light modulators 15 are known to those of skill in the art. FIG. 2 illustrates a transmissive spatial light modulator 50 in a holographic imaging system 120. The system comprises the beam splitter 34 which splits the beam 33 into the carrier beam 35 and the reference beam 37. The reference beam 37 is reflected by a mirror 138 and directed to the holographic medium 12. The carrier beam 35 is modulated by the spatial light modulator 50 and the image from the spatial light modulator comprises the signal beam 40 which is directed to the holographic medium 12, where it produces an interference pattern with the reference beam 37 to record a hologram 160 in the holographic medium 12, the hologram recording an optical wavefront representing the spatial light modulator pixel matrix into the holographic medium.

Figure 3:
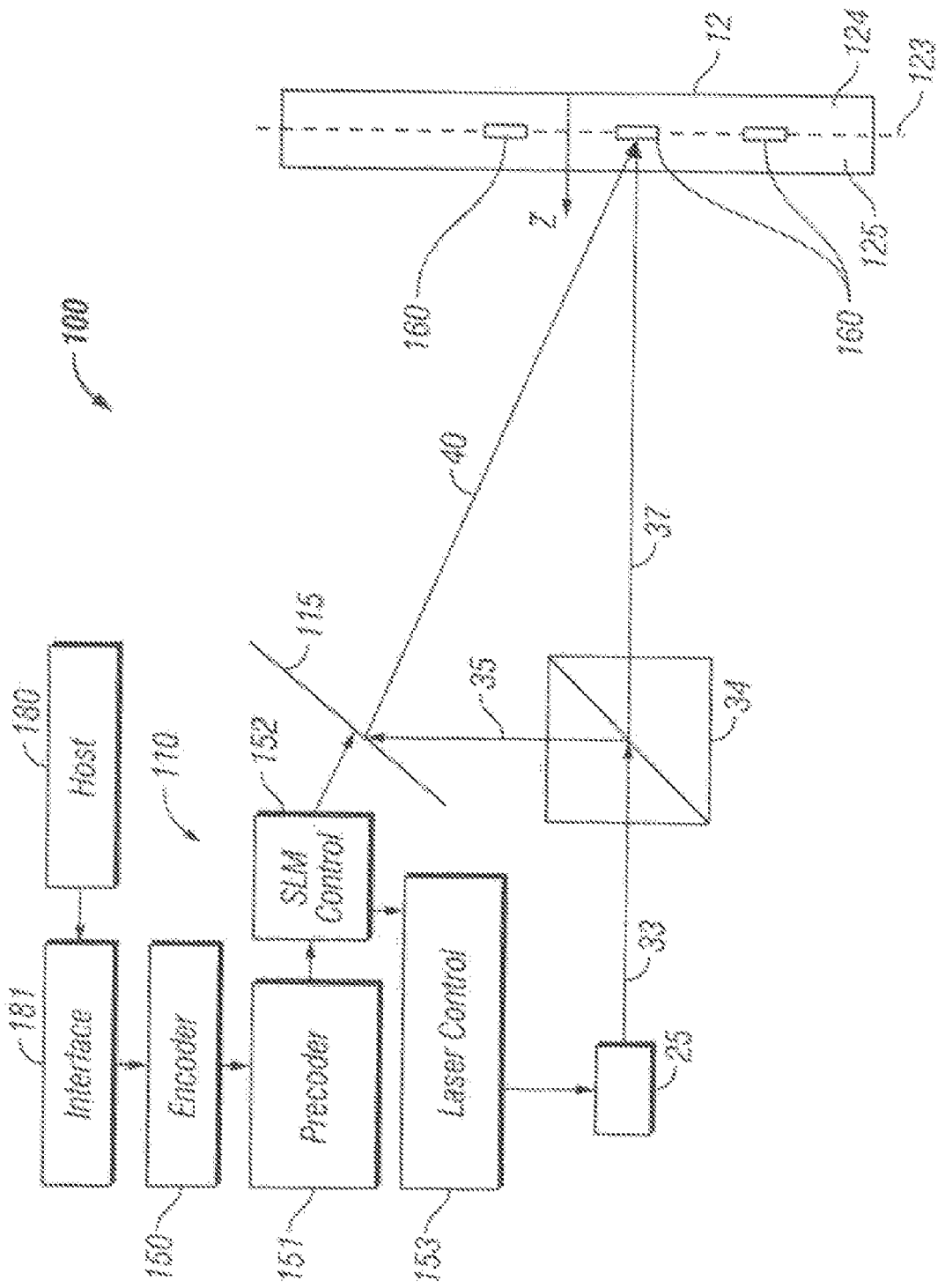
FIG. 3 is a diagrammatic illustration of an alternative holographic recording imaging system and the holographic recording system and holographic medium of FIG. 1.

FIG. 3 illustrates a reflective spatial light modulator 115 in a holographic recording system 100. Such a reflective spatial light modulator may comprise liquid crystal on silicon (LCOS) or an array of micromirrors. The holographic imaging system comprises the beam splitter 34 which splits the beam 33 into the carrier beam 35 and the reference beam 37. The reference beam 37 is directed to the holographic medium 12. The carrier beam 35 is modulated by the spatial light modulator 115 and the image from the spatial light modulator comprises the signal beam 40 which is directed to the holographic medium 12, where it produces an interference pattern with the reference beam 37 to record a hologram 160 in the holographic medium 12, the hologram recording an optical wavefront representing the spatial light modulator pixel matrix into the holographic medium.

Various types of holographic media are also known to those of skill in the art. The example illustrated in FIG. 3 comprises a data plane 123, a substrate 124 and an outer layer 125, forming a hologram having a depth in the "Z" direction no greater than the thickness of the data plane 123. The motor 14 of FIG. 1 may rotate the holographic medium about the "Z" axis to position the holographic medium 12 for recording the holograms 160.

Lenses 70 may be provided for imaging the various beams, including the beams in the write mode, and the beams in the read mode.

Figure 4:
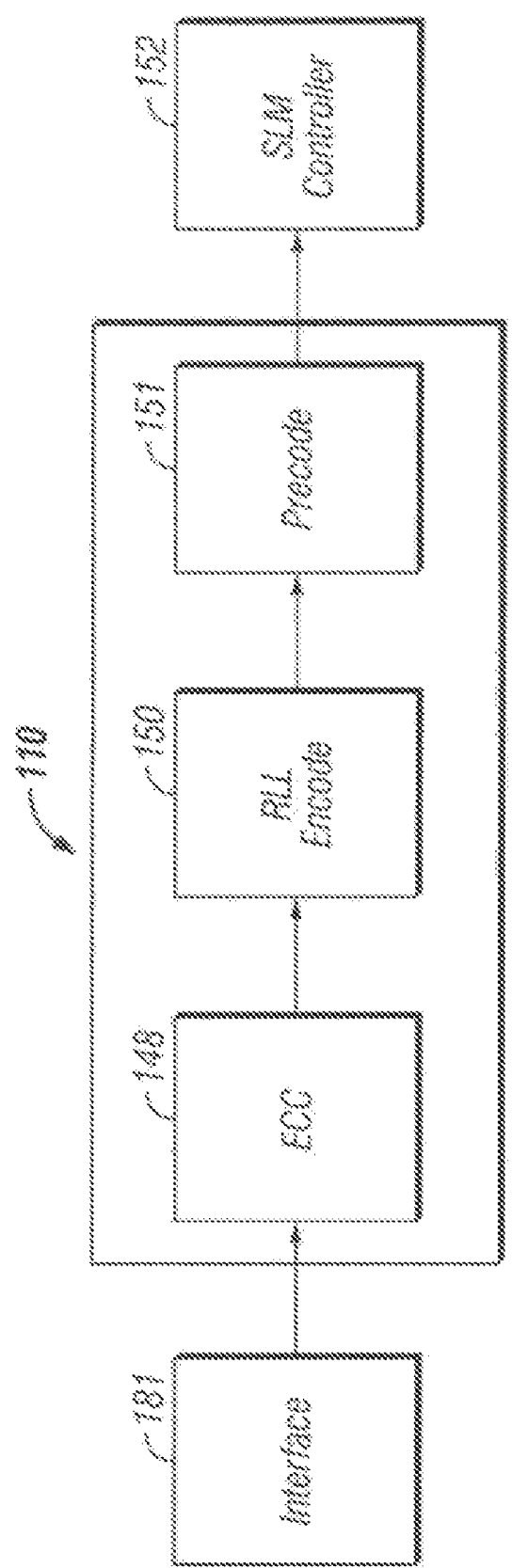
FIG. 4 is a depiction of an embodiment of the method and encoding system of the present invention.
Figure 6:
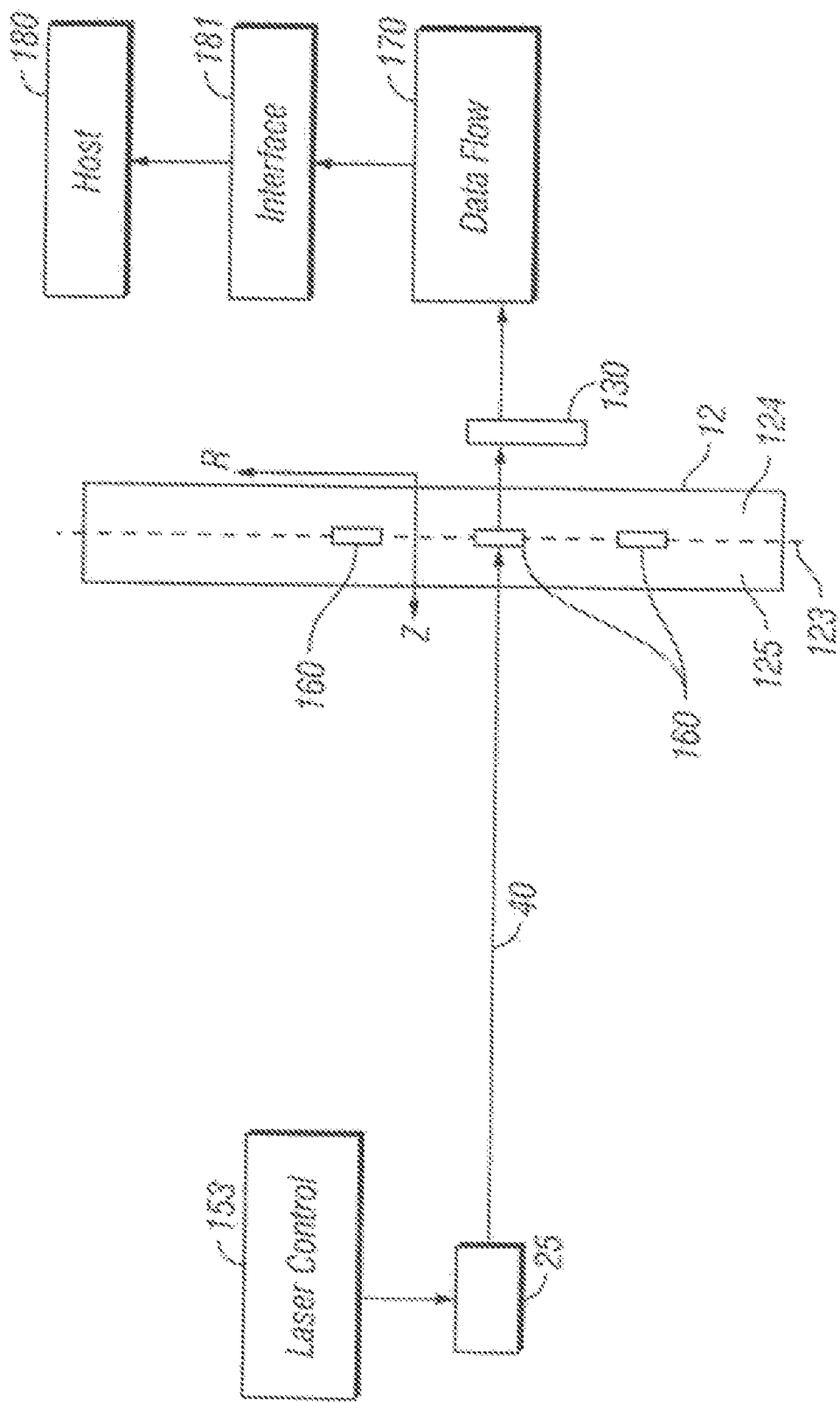
FIG. 6 is a diagrammatic illustration of a holographic detection system and holographic medium of FIG. 1.
Figure 8:
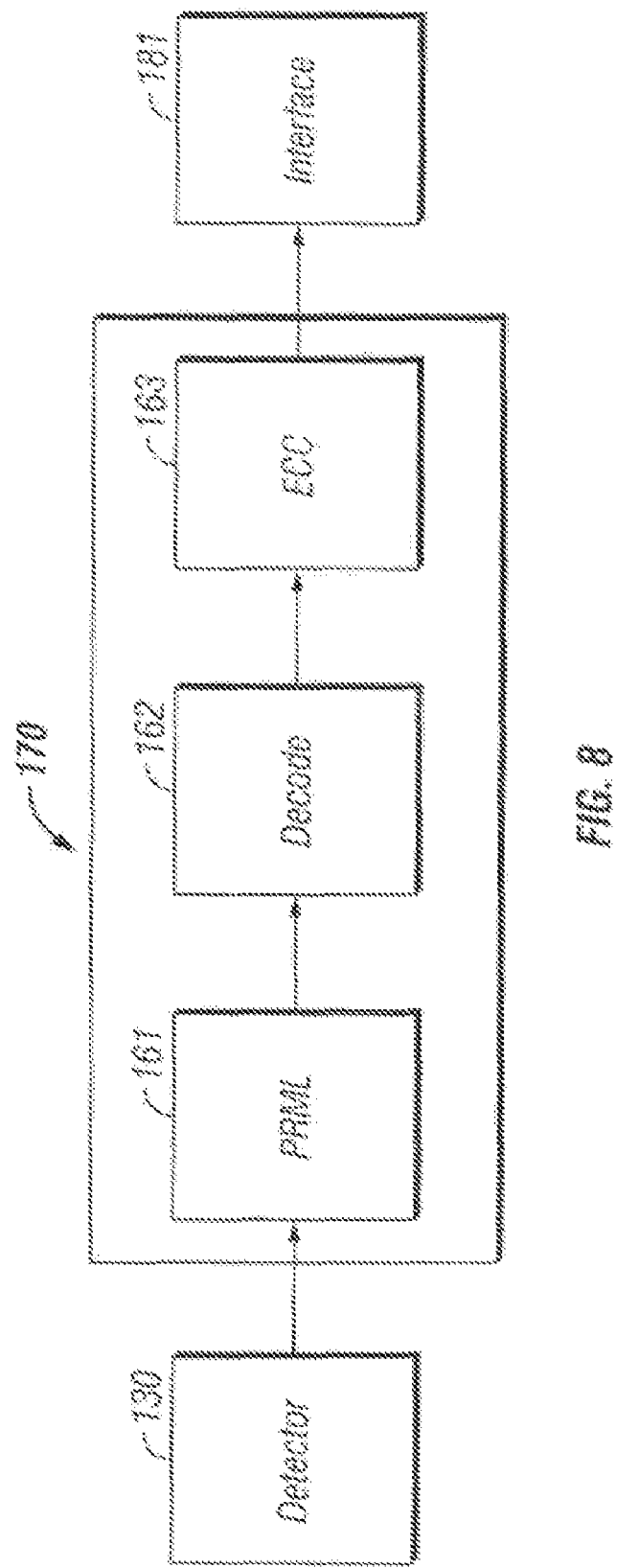
FIG. 8 is a depiction of a method and decoding system that may be employed with the present invention.

Referring to FIGS. 1, 3 and 4, an embodiment of data flow electronics 110 operates the laser 25 and spatial light modulator 15, 115 to provide the spatial light modulator pixel matrix for recording. Data to be recorded may be provided from any source, such as an external host system 180, for example, to an interface 181. Additional data handling, formatting and arrangement may be provided by the drive 10 as is known to those of skill in the art, including the formatting of information to appear around the edges of the pixel matrix. The data portion is encoded in accordance with the present invention by a run length limited encoder 150 configured to encode three bytes of data into 5×5 matrix information, the data subject to a 4-byte error correction code 148. The run length limited encoder 150 operates on lengths of data which it also arranges into a format that will result in an arrangement of the data into 5×5 matrices by a SLM controller 152. The error correction code 148 may be applied by the encoder 150 prior to being run length limited encoded, or the error correction code may be applied by the host system 180 or by a separate element of the data flow electronics 110. The resultant encoded data may be precoded by precoder 151 to set up appropriate delays in the data to enhance data detection. For example, selected bits may be delayed to provide sufficient spacing in the data strings to enhance detection of both long and short lengths of similar bits or strings. For example, the precoder 151 may implement the polynomial $1/(1-D^2)$, where D is a unit delay operator.

Figure 5:
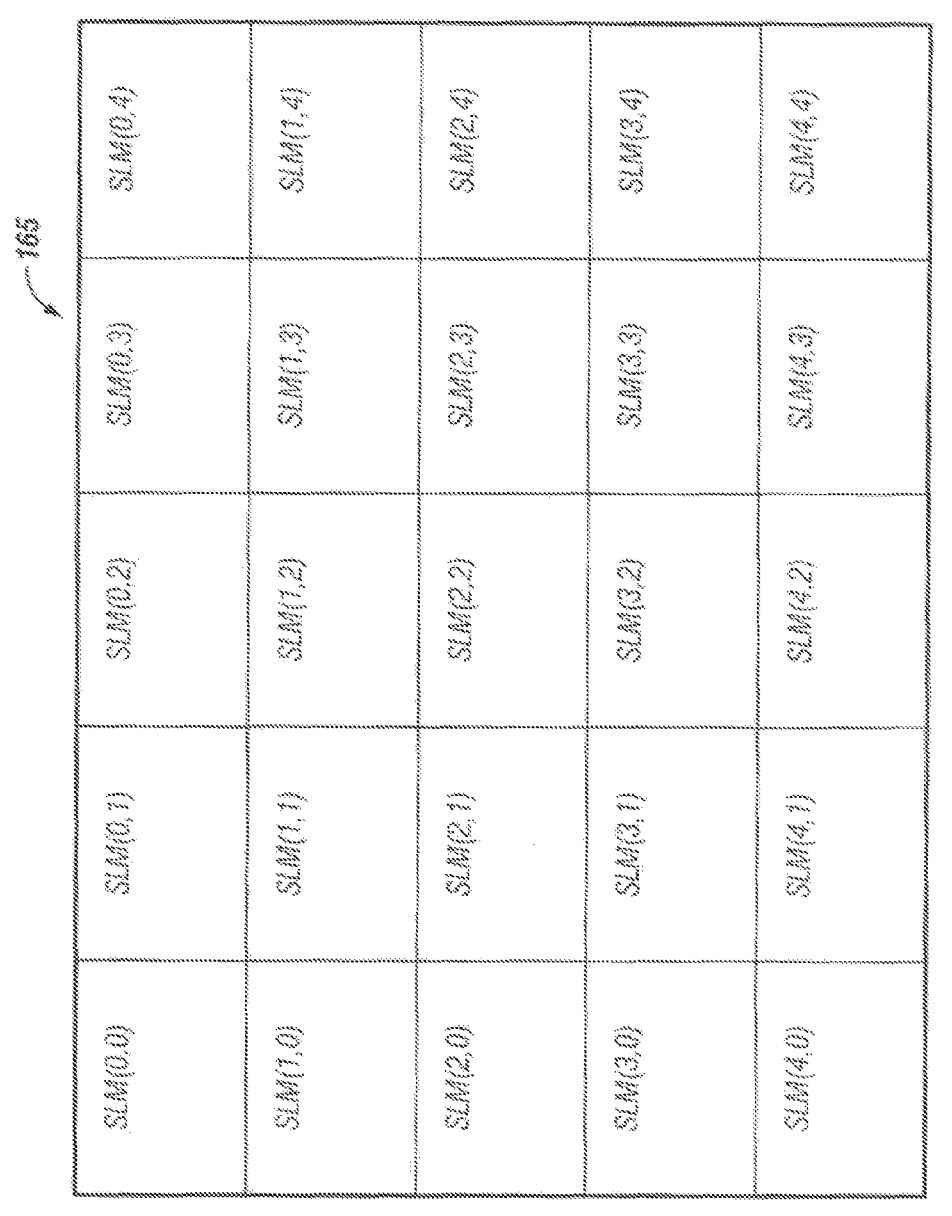

Referring additionally to FIG. 5, the run length limited encoder 150 provides run length limited encoded data from a serial bit stream of customer data, which encoded data operates the SLM controller 152 to create 5×5 matrix blocks of encoded data 165. For example, the data area of the spatial light modulator 15, 115 might be 20×20, holding 16 patterns of 5×5 matrices. Each bit of the matrix block is designated first by the row position and secondly by the column bit position. For example, bit "SLM(2,3)" is in the $3^{rd}$ row and the $4^{th}$ column.

An embodiment of a run length limited code to create 5×5 matrix information comprises a (0, 14/13) run length limited code, where "0" is the minimum number of zeros between ones, 14 is the maximum number of zeros between ones, and 13 is the maximum number of zeros between even and odd subsequences of the data bits.

A formula indicating an embodiment of the above run length limited code is provided below. The three bytes of customer data are: first byte (U0, U1, U2, U3, U4, U5, U6, U7); second byte (V0, V1, V2, V3, V4, V5, V6, V7); and the third byte (W0, W1, W2, W3, W4, W5, W6, W7). The run length limited code uses an input, the three bytes of customer data and creates 5×5 matrix information which is displayed on the spatial light modulator 15, 115 as a two-dimensional pixel matrix. The elements of the matrix are encoded according to the following formula, where ". . ." is the compliment operator.

First Row of Spatial Light Modulator

SLM(0,0)=(U4 <OR> U5 <OR> U6 <OR> U7) <AND> [U2 <AND> ¬(U0 <AND> U3) <OR> U0 <AND> (¬U1 <OR> U2)]

SLM(0,1)=(U4 <OR> U5 <OR> U6 <OR> U7) <AND> (U0 <OR> ¬U2)

SLM(0,2)=¬[(U0 <OR> U1 <OR> U2 <OR> U3) <AND> (U4 <OR> U5 <OR> U6 <OR> U7)] <OR> U1

SLM(0,3)=¬[(U0 <OR> U1 <OR> U2 <OR> U3) <AND> (U4 <OR> U5 <OR> U6 <OR> U7)] <OR> U2

SLM(0,4)=[(U0 <OR> U1 <OR> U2 <OR> U3) <AND> ¬(U4 <OR> U5 <OR> U6 <OR> U7)] <OR> U3

Second Row of Spatial Light Modulator

SLM(1,0)=V0, SLM(1,1)=V1, SLM(1,2)=V2, SLM(1,3)=V3, SLM(1,4)=V4.

Third Row of Spatial Light Modulator

SLM(2,0)=V5, SLM(2,1)=V6, SLM(2,2)=V7

SLM(2,3)={[(U0 <OR> U1 <OR> U2 <OR> U3) <AND> ¬(U4 <OR> U5 <OR> U6 <OR> U7)] <OR> U4} <AND> (U0 <OR> U4)

SLM(2,4)={[(U0 <OR> U1 <OR> U2 <OR> U3) <AND> ¬(U4 <OR> U5 <OR> U6 <OR> U7)] <OR> U5} <AND> (U1 <OR> U5)

Fourth Row of Spatial Light Modulator

SLM(3,0)={[(U0 <OR> U1 <OR> U2 <OR> U3) <AND> ¬(U4 <OR> U5 <OR> U6 <OR> U7)] <OR> U6} <AND> (U2 <OR> U6)

SLM(3,1)={[(U0 <OR> U1 <OR> U2 <OR> U3) <AND> ¬(U4 <OR> U5 <OR> U6 <OR> U7)] <AND> U3} <OR> U7 <OR> ¬(U0 <OR> U1 <OR> U2 <OR> U3 <OR> U4 <OR> U5 <OR> U6 <OR> U7)

SLM(3,2)=W0, SLM(3,3)=W1, SLM(3,4)=W2

Fifth Row of Spatial Light Modulator

SLM(4,0)=W3, SLM(4,1)=W4, SLM(4,2)=W5, SLM(4,3)=W6, SLM(4,4)=W7

The resultant 5×5 matrix data may be precoded by precoder 151 and then accumulated and arranged by the SLM controller 152, for example, into a 20×20 matrix with suitable formatting, etc., and loaded into the spatial light modulator 15, 115.

Once the SLM controller 152 has loaded all the data (with formatting, etc.) into the spatial light modulator 15, 115, the SLM controller toggles a laser controller 153 to operate the laser 25 in the write mode, and the holographic imaging system records an optical wavefront representing the spatial light modulator pixel matrix into the holographic medium 12 to record the hologram 160.

The 5×5 matrix breaks up the input serial data string into groupings arranged so that the ECC can handle likely data errors. The run length limited encoding is configured to conform to the 5×5 matrix. The ECC comprises a 4-bit burst, 4-byte string length capability, and may comprise a multi-level ECC. Examples of ECC are discussed in the incorporated U.S. Pat. No. 6,275,965. Specific formulas as known to those of skill in the art may be employed to provide the run length limited encoding to the desired parameter of covering at least a 5×5 matrix.

Referring to FIGS. 1, 6, 7 and 8, the recorded holographic image 160 is subsequently read by laser 25 providing read or reference beam 40 imaging the hologram 160 onto an optical detector 130. The reference beam is diffracted by the interference pattern of the hologram to form image 140 resembling the original image of the spatial light modulator. The optical detector 130 captures the information comprising the image 140, as is known to those of skill in the art and provides data information representing the full holographic image. Decoding data flow apparatus 170 is configured to rearrange data from a pixel matrix to 5×5 matrix information and configured to decode the 5×5 matrix information into 3-byte sets of data. A first step may comprise applying a data detector to identify the strings of data as read from optical detector 130. An example of a data detector comprises a Viterbi PRML (partial response, minimum length) detector 161, for example, based on a 1-D$^2$ algorithm, which is the inverse of the algorithm discussed at precoder step 151 of the write process, as is known to those of skill in the art. As is known by those of skill in the art, a Viterbi PRML detector selects the most likely outcomes of the received signal strings, and excludes the unlikely outcomes. Then the data is decoded by the run length limited code 162, for example, employing the following equations. Finally, the ECC 163 is applied to recover and correct errors, if any, in the data bytes U, V, and W, so that they can be sent to host system 180 via interface 181.

In accordance with the run length limited code 150 of the write system, the following equations are employed to decode the 5×5 matrix run length limited encoded data in step 162.

First Byte: (U0,U1,U2,U3,U4,U5,U6,U7)

U0=([¬DET(0,0) <AND> ¬DET(0,1) <AND> DET(0,4)] <AND> DET(2,3)) <OR> ((DET(0,0) <AND> DET(0,1)) <OR> (DET(0,1) <AND> DET(0,3) <AND> DET(0,4)))

U1=([¬DET(0,0) <AND> ¬DET(0,1) <AND> DET(0,4)] <AND> DET(2,4)) <OR> ((DET(0,1) <AND> DET(0,2) <AND> ¬DET(0,3)) <OR> (DET(0,0) <AND> DET(0,2) <OR> (DET(0,1) <AND> DET(0,2) <AND> DET(0,4))

U2=([¬DET(0,0) <AND> ¬DET(0,1) <AND> DET(0,4)] <AND> DET(3,0)) <OR> ((DET(0,1) <AND> DET(0,2) <AND> DET(0,3) <AND> DET(0,4)) <OR> (DET(0,0) <AND> ¬DET(0,1)) <OR> (DET(0,0) <AND> DET(0,1) <AND> DET(0,3)))

U3=([¬DET(0,0) <AND> ¬DET(0,1) <AND> DET(0,4)] <AND> DET(3,1)) <OR> ((¬DET(0,0) <AND> DET(0,1) <AND> DET(0,4)) <OR> (DET(0,0) <AND> DET(0,4)))

U4=[DET(0,0) <OR> DET(0,1)] <AND> DET(2,3)

U5=[DET(0,0) <OR> DET(0,1)] <AND> DET(2,4)

U6=[DET(0,0) <OR> DET(0,1)] <AND> DET(3,0)

U7=[DET(0,0) <OR> DET(0,1)] <AND> DET(3,1)

Second Byte: (V0,V1,V2,V3,V4,V5,V6,V7)

V0=DET(1,0), V1=DET(1,1), V2=DET(1,2), V3=DET(1,3), V4=DET(1,4), V5=DET(2,0),

V6=DET(2,1), V7=DET(2,2)

Third Byte: (W0,W1,W2,W3,W4,W5,W6,W7)

W0=DET(3,2), W1=DET(3,3), W2=DET(3,4), W3=DET(4,0), W4=SLM(4,1), W5=DET(4,2), W6=DET(4,3), W6=DET(4,4).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for encoding data for recording into a holographic medium, comprising the steps of:

run length limited encoding three bytes of data into 5×5 matrix information, said data subject to a 4-byte error correction code;

providing said 5×5 matrix information to a spatial light modulator, as a portion of a two-dimensional pixel matrix of said spatial light modulator, for recording into a holographic image on said holographic medium;

encoding said data with an error correction code having 4-bit burst, 4-byte string length capability prior to said run length limited encoding step;

wherein said run length limited encoding step comprises a (0, 14/13) run length limited code; and wherein said run length limited encoding step comprises the formula:

First Row of Spatial Light Modulator

SLM(0,0)=(U4 <OR> U5 <OR> U6 <OR> U7) <AND> [U2 <AND> ¬(U0 <AND> U3) <OR> U0 <AND> (U1 <OR> U2)]

SLM(0,1)=(U4 <OR> U5 <OR> U6 <OR> U7) <AND> (U0 <OR> ¬U2)
SLM(0,2)=¬[(U0 <OR> U1 <OR> U2 <OR> U3) <AND> (U4 <OR> U5 <OR> U6 <OR> U7)] <OR> U1
SLM(0,3)=¬[(U0 <OR> U1 <OR> U2 <OR> U3) <AND> (U4 <OR> U5 <OR> U6 <OR> U7)] <OR> U2
SLM(0,4)=[(U0 <OR> U1 <OR> U2 <OR> U3) <AND> ¬(U4 <OR> U5 <OR> U6 <OR> U7)] <OR> U3
Second Row of Spatial Light Modulator
SLM(1,0)=V0, SLM(1,1)=V1, SLM(1,2)=V2, SLM(1,3)=V3, SLM(1,4)=V4
Third Row of Spatial Light Modulator
SLM(2,0)=V5, SLM(2,1)=V6, SLM(2,2)=V7
SLM(2,3)={[(U0 <OR> U1 <OR> U2 <OR> U3) <AND> ¬(U4 <OR> U5 <OR> U6 <OR> U7)] <OR> U4} <AND> (U0 <OR> U4)
SLM(2,4)={[(U0 <OR> U1 <OR> U2 <OR> U3) <AND> ¬(U4 <OR> U5 <OR> U6 <OR> U7)] <OR> U5} <AND> (U1 <OR> U5)
Fourth Row of Spatial Light Modulator
SLM(3,0)={[(U0 <OR> U1 <OR> U2 <OR> U3) <AND> ¬(U4 <OR> U5 <OR> U6 <OR> U7)] <OR> U6} <AND> (U2 <OR> U6)
SLM(3,1)={[(U0 <OR> U1 <OR> U2 <OR> U3) <AND> ¬(U4 <OR> U5 <OR> U6 <OR> U7)] <AND> U3} <OR> U7 <OR> ¬(U0 <OR> U1 <OR> U2 <OR> U3 <OR> U4 <OR> U5 <OR> U6 <OR> U7)
SLM(3,2)=W0, SLM(3,3)=W1, SLM(3,4)=W2
Fifth Row of Spatial Light Modulator
SLM(4,0)=W3, SLM(4,1)=W4, SLM(4,2)=W5, SLM(4,3)=W6, SLM(4,4)=W7.

2. The method of claim 1, additionally comprising the step of recording said spatial light modulator pixel matrix on said holographic medium.

3. An encoding system configured to encode data for recording into a holographic medium, comprising:
a run length limited encoder configured to encode three bytes of data into 5×5 matrix information, said data subject to a 4-byte error correction code;
a spatial light modulation input configured to arrange said 5×5 matrix information into a portion of a two-dimensional pixel matrix of a spatial light modulator;
an error correction encoder configured to encode a string of data with an error correction code having 4-bit burst, 4-byte string length capability, and to provide said encoded data for said run length limited encoder;
wherein said run length limited encoder implements a (0, 14/13) run length limited code; and
wherein said run length limited encoder implements the formula:
First Row of Spatial Light Modulator
SLM(0,0)=(U4 <OR> U5 <OR> U6 <OR> U7) <AND> [U2 <AND> ¬(U0 <AND> U3) <OR> U0 <AND> (¬U1 <OR> U2)]
SLM(0,1)=(U4 <OR> U5 <OR> U6 <OR> U7) <AND> (U0 <OR> ¬U2)
SLM(0,2)=¬[(U0 <OR> U1 <OR> U2 <OR> U3) <AND> (U4 <OR> U5 <OR> U6 <OR> U7)] <OR> U1
SLM(0,3)=¬[(U0 <OR> U1 <OR> U2 <OR> U3) <AND> (U4 <OR> U5 <OR> U6 <OR> U7)] <OR> U2
SLM(0,4)=[(U0 <OR> U1 <OR> U2 <OR> U3) <AND> ¬(U4 <OR> U5 <OR> U6 <OR> U7)] <OR> U3
Second Row of Spatial Light Modulator
SLM(1,0)=V0, SLM(1,1)=V1, SLM(1,2)=V2, SLM(1,3)=V3, SLM(1,4)=V4
Third Row of Spatial Light Modulator
SLM(2,0)=V5, SLM(2,1)=V6, SLM(2,2)=V7
SLM(2,3)={[(U0 <OR> U1 <OR> U2 <OR> U3) <AND> ¬(U4 <OR> U5 <OR> U6 <OR> U7)] <OR> U4} <AND> (U0 <OR> U4)
SLM(2,4)={[(U0 <OR> U1 <OR> U2 <OR> U3) <AND> ¬(U4 <OR> U5 <OR> U6 <OR> U7)] <OR> U5} <AND> (U1 <OR> U5)
Fourth Row of Spatial Light Modulator
SLM(3,0)={[(U0 <OR> U1 <OR> U2 <OR> U3) <AND> ¬(U4 <OR> U5 <OR> U6 <OR> U7)] <OR> U6} <AND> (U2 <OR> U6)
SLM(3,1)={[(U0 <OR> U1 <OR> U2 <OR> U3) <AND> ¬(U4 <OR> U5 <OR> U6 <OR> U7)] <AND> U3} <OR> U7 <OR> ¬(U0 <OR> U1 <OR> U2 <OR> U3 <OR> U4 <OR> U5 <OR> U6 <OR> U7)
SLM(3,2)=W0, SLM(3,3)=W1, SLM(3,4)=W2
Fifth Row of Spatial Light Modulator
SLM(4,0)=W3, SLM(4,1)=W4, SLM(4,2)=W5, SLM(4,3)=W6, SLM(4,4)=W7.

4. A recording system configured to record data into a holographic medium, comprising:
a run length limited encoder configured to encode three bytes of data into 5×5 matrix information, said data subject to a 4-byte error correction code;
a spatial light modulator configured to arrange said 5×5 matrix information into a portion of a two-dimensional pixel matrix;
a holographic imaging system configured to provide beams to record an optical wavefront representing said spatial light modulator pixel matrix into a holographic medium;
an error correction encoder configured to encode a string of data with an error correction code having 4-bit burst, 4-byte string length capability, and to provide said encoded data for said run length limited encoder;
wherein said run length limited encoder implements a (0, 14/13) run length limited code; and
wherein said run length limited encoder implements the formula:
First Row of Spatial Light Modulator
SLM(0,0)=(U4 <OR> U5 <OR> U6 <OR> U7) <AND> [U2 <AND> ¬(U0 <AND> U3) <OR> U0 <AND> (¬U1 <OR> U2)]
SLM(0,1)=(U4 <OR> U5 <OR> U6 <OR> U7) <AND> (U0 <OR> ¬U2)
SLM(0,2)=¬[(U0 <OR> U1 <OR> U2 <OR> U3) <AND> (U4 <OR> U5 <OR> U6 <OR> U7)] <OR> U1
SLM(0,3)=¬[(U0 <OR> U1 <OR> U2 <OR> U3) <AND> (U4 <OR> U5 <OR> U6 <OR> U7)] <OR> U2
SLM(0,4)=[(U0 <OR> U1 <OR> U2 <OR> U3) <AND> ¬(U4 <OR> U5 <OR> U6 <OR> U7)] <OR> U3
Second Row of Spatial Light Modulator
SLM(1,0)=V0, SLM(1,1)=V1, SLM(1,2)=V2, SLM(1,3)=V3, SLM(1,4)=V4
Third Row of Spatial Light Modulator
SLM(2,0)=V5, SLM(2,1)=V6, SLM(2,2)=V7
SLM(2,3)={[(U0 <OR> U1 <OR> U2 <OR> U3) <AND> ¬(U4 <OR> U5 <OR> U6 <OR> U7)] <OR> U4} <AND> (U0 <OR> U4)
SLM(2,4)={[(U0 <OR> U1 <OR> U2 <OR> U3) <AND> ¬(U4 <OR> U5 <OR> U6 <OR> U7)] <OR> U5} <AND> (U1 <OR> U5)
Fourth Row of Spatial Light Modulator
SLM(3,0)={[(U0 <OR> U1 <OR> U2 <OR> U3) <AND> ¬(U4 <OR> U5 <OR> U6 <OR> U7)] <OR> U6} <AND> (U2 <OR> U6)
SLM(3,1)={[(U0 <OR> U1 <OR> U2 <OR> U3) <AND> ¬(U4 <OR> U5 <OR> U6 <OR> U7)] <AND> U3}

<OR> U7 <OR> ¬(U0 <OR> U1 <OR> U2 <OR> U3 <OR> U4 <OR> U5 <OR> U6 <OR> U7)
SLM(3,2)=W0, SLM(3,3)=W1, SLM(3,4)=W2

Fifth Row of Spatial Light Modulator
SLM(4,0)=W3, SLM(4,1)=W4, SLM(4,2)=W5, SLM(4,3)=W6, SLM(4,4)=W7.

5. A holographic recording drive, comprising:
a drive system configured to position a holographic medium for recording;
a run length limited encoder configured to encode three bytes of data into 5×5 matrix information, said data subject to a 4-byte error correction code;
a spatial light modulator configured to arrange said 5×5 matrix information into a portion of a two-dimensional pixel matrix; and
a holographic imaging system configured to provide beams to record an optical wavefront representing said spatial light modulator pixel matrix into a holographic medium;
an error correction encoder configured to encode a string of data with an error correction code having 4-bit burst, 4-byte string length capability, and to provide said encoded data for said run length limited encoder;
wherein said run length limited encoder implements a (0, 14/13) run length limited code; and
wherein said run length limited encoder implements the formula:

First Row of Spatial Light Modulator
SLM(0,0)=(U4 <OR> U5 <OR> U6 <OR> U7) <AND> [U2 <AND> ¬(U0 <AND> U3) <OR> U0 <AND> ( ¬U1<OR> U2)]
SLM(0,1)=(U4 <OR> U5 <OR> U6 <OR> U7) <AND> (U0 <OR> ¬U2)
SLM(0,2)=¬[(U0 <OR> U1 <OR> U2 <OR> U3) <AND> (U4 <OR> U5 <OR> U6 <OR> U7)] <OR> U1
SLM(0,3)=¬[(U0 <OR> U1 <OR> U2 <OR> U3) <AND> (U4 <OR> U5 <OR> U6 <OR> U7)] <OR> U2
SLM(0,4)=[(U0 <OR> U1 <OR> U2 <OR> U3) <AND> ¬(U4 <OR> U5 <OR> U6 <OR> U7)] <OR> U3

Second Row of Spatial Light Modulator
SLM(1,0)=V0, SLM(1,1)=V1, SLM(1,2)=V2, SLM(1,3)=V3, SLM(1,4)=V4

Third Row of Spatial Light Modulator
SLM(2,0)=V5, SLM(2,1)=V6, SLM(2,2)=V7
SLM(2,3)={[(U0 <OR> U1 <OR> U2 <OR> U3) <AND> ¬(U4 <OR> U5 <OR> U6 <OR> U7)] <OR> U4} <AND> (U0 <OR> U4)
SLM(2,4)={[(U0 <OR> U1 <OR> U2 <OR> U3) <AND> ¬(U4 <OR> U5 <OR> U6 <OR> U7)] <OR> U5} <AND> (U1<OR> U5)

Fourth Row of Spatial Light Modulator
SLM(3,0)={[(U0 <OR> U1 <OR> U2 <OR> U3) <AND> ¬(U4 <OR> U5 <OR> U6 <OR> U7)] <OR> U6} <AND> (U2 <OR> U6)
SLM(3,1)={[(U0 <OR> U1 <OR> U2 <OR> U3) <AND> ¬(U4 <OR> U5 <OR> U6 <OR> U7)] <AND> U3} <OR> U7 <OR> ¬(U0 <OR> U1 <OR> U2 <OR> U3 <OR> U4 <OR> U5 <OR> U6 <OR> U7)
SLM(3,2)=W0, SLM(3,3)=W1, SLM(3,4)=W2

Fifth Row of Spatial Light Modulator
SLM(4,0)=W3, SLM(4,1)=W4, SLM(4,2)=W5, SLM(4,3)=W6, SLM(4,4)=W7.

6. The holographic recording drive of claim 5, additionally comprising:
an optical detector configured to detect data recorded on a holographic medium and provide data information; and
decoding data flow apparatus configured to rearrange data from a pixel matrix to 5×5 matrix information and configured to decode said 5×5 matrix information into 3-byte sets of data.

* * * * *